INVENTORS
James J. Dickson
Ernest Loeb
BY William A. Ryan
ATTORNEY

INVENTORS
James J. Dickson
Ernest Loeb

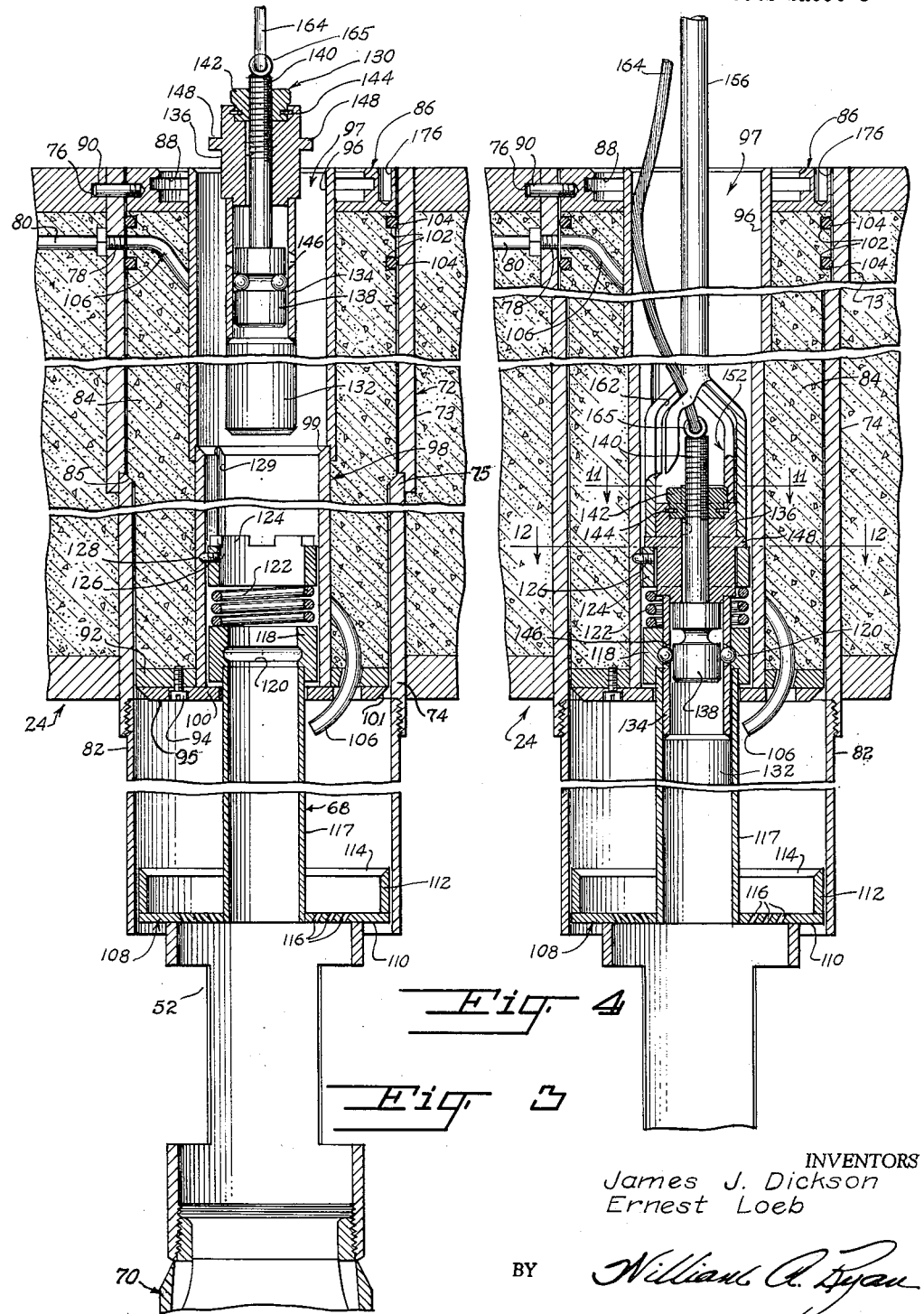

May 16, 1961 J. J. DICKSON ET AL 2,984,609
TELESCOPING FUEL ELEMENT ASSEMBLY FOR NUCLEAR REACTORS
Filed May 6, 1957 6 Sheets-Sheet 4

INVENTORS
James J. Dickson
Ernest Loeb
BY William A. Ryan
ATTORNEY

INVENTORS
James J. Dickson
Ernest Loeb
BY
ATTORNEY

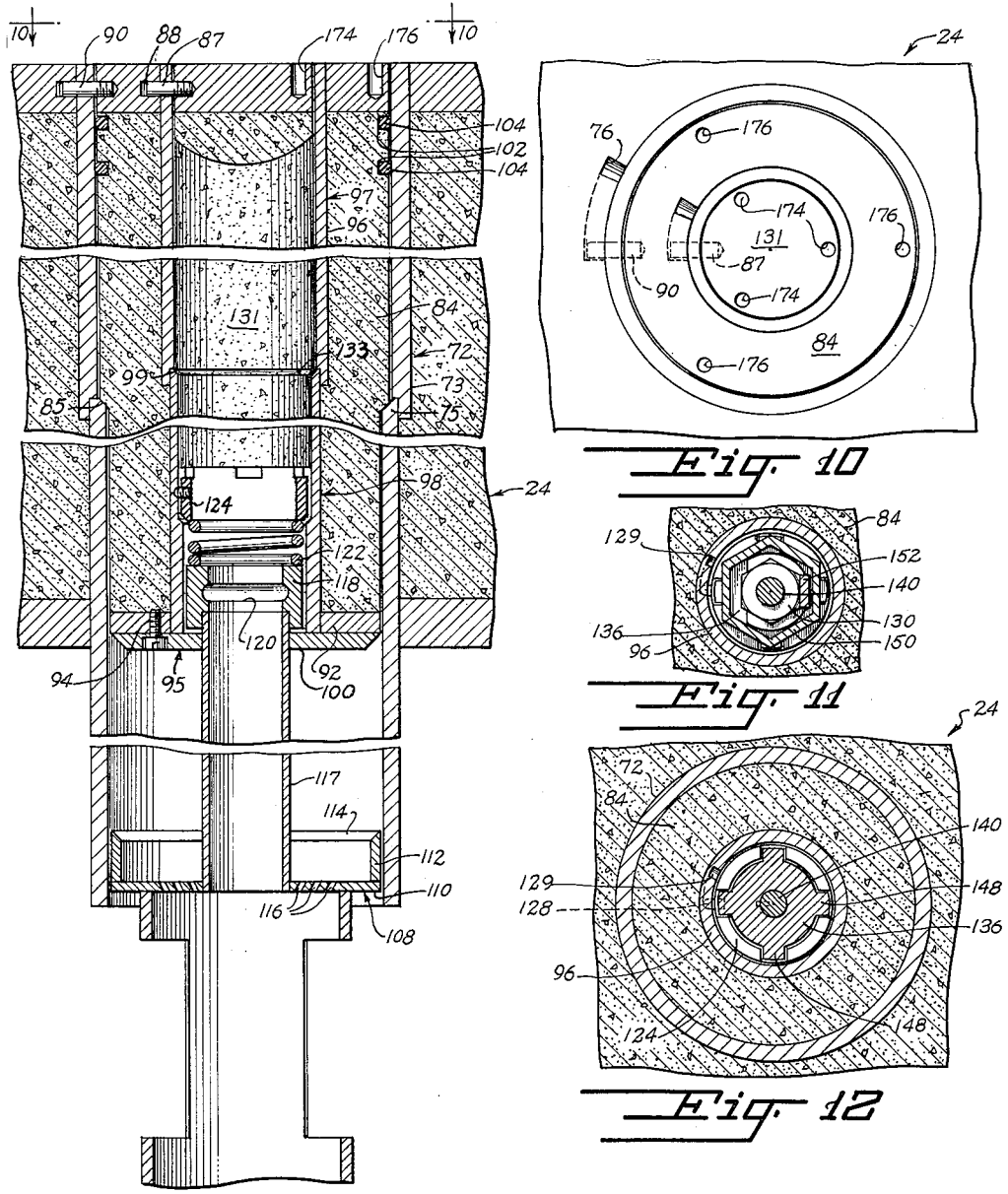

United States Patent Office 2,984,609
Patented May 16, 1961

2,984,609
TELESCOPING FUEL ELEMENT ASSEMBLY FOR NUCLEAR REACTORS

James J. Dickson, Hyattsville, and Ernest Loeb, Silver Spring, Md., assignors, by mesne assignments, to Allis-Chalmers Manufacturing Company, a corporation of Delaware Filed May 6, 1957, Ser. No. 657,084
12 Claims. (Cl. 204—193.2)

This invention relates to improvements in fuel assemblies for nuclear reactors.

One of the main objects of the invention is to substantially reduce the overall length of the structure by providing for telescopic association of its parts.

Another object of the invention comprehends the use of a major portion of the existing shielding of the assembly during and after removable of the reactor structure.

Another object of the invention is to provide a complete fuel assembly in one unit and one flask, whereby no separate parts are required for inventory.

Another object of the invention is to provide an assembly in which the central or inner shield plug may be replaced by a removal tool which is so designed as to provide adequate shielding during removal, the shield plug being available for use in the replacement fuel assembly.

Other objects and purposes of the present invention will be apparent from a consideration of the following disclosure and drawings wherein:

Fig. 3 is an enlarged sectional elevation of part of the reactor shown in Fig. 1 including the top part of a fuel element assembly and a removal tool in raised, detached relation to the fuel element assembly;

Fig. 4 is a sectional elevation similar to Fig. 3 and showing the removal tool in lowered, attached relation to the fuel element assembly;

Fig. 9 is an enlarged sectional elevation of part of the reactor shown in Fig. 1 including the upper part of a fuel element assembly and an associated shield plug;

Fig. 10 is a view taken along the line 10—10 of Fig. 9;

Fig. 11 is a view taken along the line 11—11 of Fig. 4; and

Fig. 12 is a view taken along the line 12—12 of Fig. 4.

Figure 1:
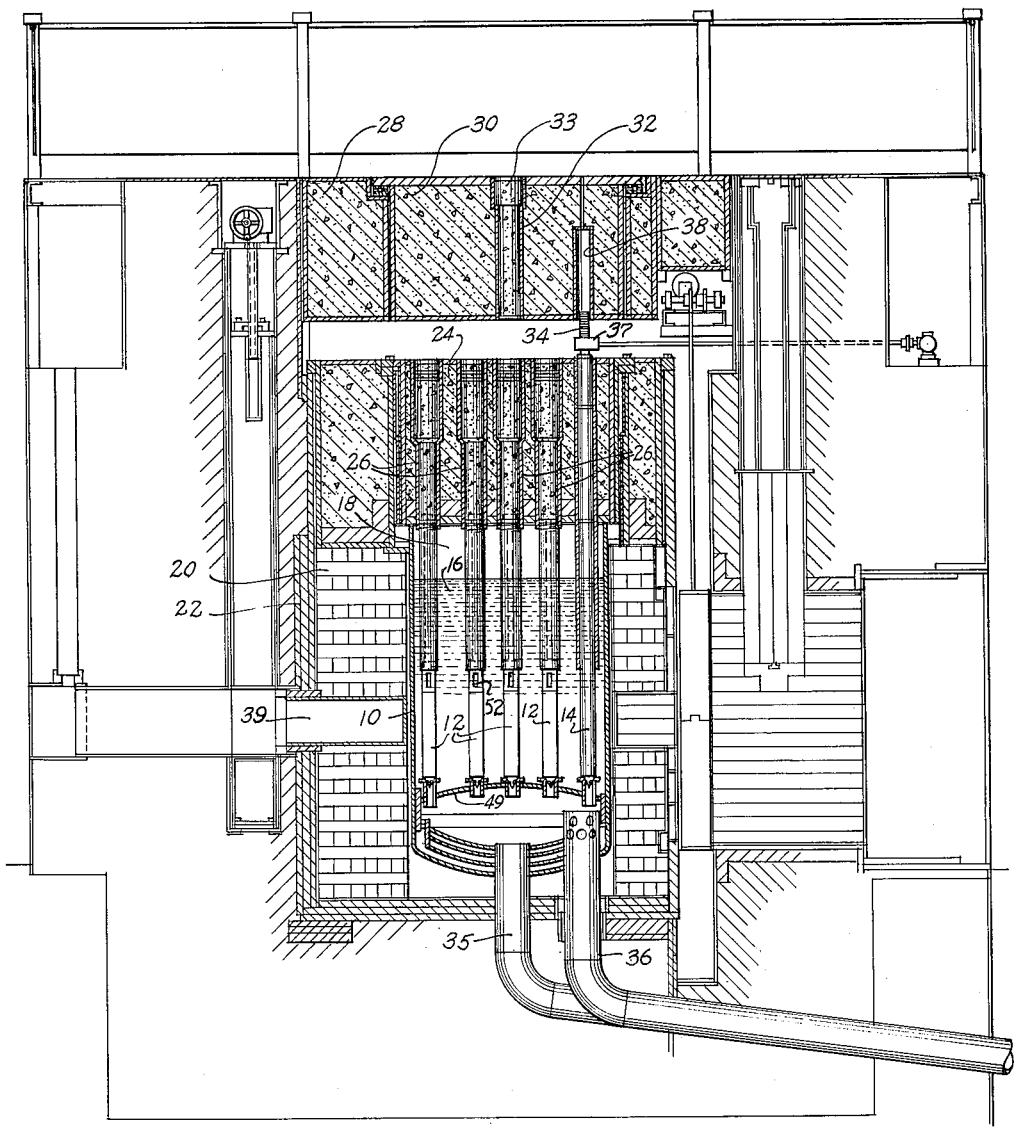
Fig. 1 is a sectional view of a nuclear reactor utilizing the present invention.
Figure 2:
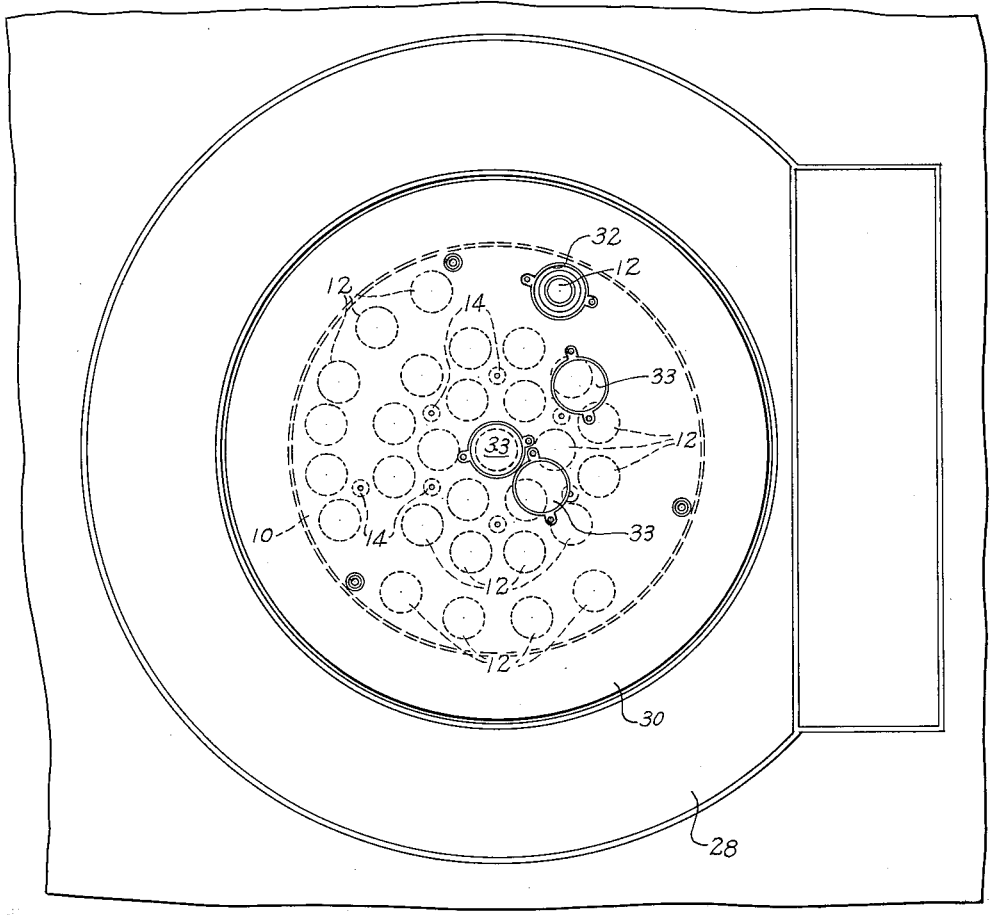
Fig. 2 is a top plan view of the nuclear reactor.

In order to understand the present invention it is necessary to first consider a nuclear reactor generally such as the type illustrated in Figs. 1 and 2, wherein the reactor includes essentially a cylindrical tank 10 of aluminum or the like in which the fission process occurs. A plurality of relatively rigid elongated fuel element assemblies 12 are inserted into the tank 10 in close proximity to one another (Fig. 2). A plurality of control rods 14 of cadmium or the like are similarly inserted into the tank 10 and displaced periodically between the fuel element assemblies 12 (Fig. 2). A moderator-coolant 16 such as heavy water ($D_2O$) or the like partially fills the tank 10 and completely surrounds the fuel element assemblies 12 and the control rods 14 inserted in the tank. The remaining volume of the tank is filled with an inert gas such as helium thereby forming a blanket 18 above the moderator-coolant 16. The interior of the tank 10 with the foregoing elements in place is generally referred to as the core of the reactor. A reflector 20 made of graphite blocks or the like completely surrounds the tank 10 and such reflector is in turn surrounded by any suitable shielding material 22 such as lead or the like. Atop the tank 10 is the inner shield 24 of concrete or the like, and in which there are a plurality of cylindrical recesses 26 adapted to receive the fuel element assemblies 12 and the control rods 14. Above the inner shield 24 is the top shield 28 and the center shield 30. A plurality of cylindrical recesses 32 in the center shield 30 are adapted to receive the fuel element assemblies 12 and the operating mechanisms of the control rods 14.

The operation of the type of reactor illustrated in Fig. 1 is accomplished by the gradual removal of the control rods 14 from the core into the recesses 26 in the inner shield 24 thereby allowing the uranium fuel contained in the fuel assemblies 12 to bombard one another with neutrons which are naturally given off by uranium. As each free neutron strikes another atom of uranium that atom splits or fissions giving more free neutrons and energy in the form of heat and radioactive particles. When the control rods 14, whose function it is to absorb neutrons thereby preventing their interaction with other uranium atoms, are sufficiently removed from the core the fission process becomes self-sustaining and the "chain reaction" occurs which is usually referred to as the reactor being "critical." To insure the reactor operating at a uniform level after going critical, one control rod 14, usually referred to as the fine control rod, is continuously inserted into and removed from the reactor by means of the rack 34 and gear 37 wherein the gear is situated between the inner shield 24 and the top shield 28. The rack 34 extends into a recess 38 provided in the center shield 30. The free neutrons issuing as a result of the fission process must be slowed down from their high initial velocity to their thermal velocities in order that they may efficiently propagate the chain reaction, which slowing down is accomplished by the moderator 16 chosen for this purpose. The moderator 16 for the reactor illustrated in Fig. 1 also serves as a coolant for the reactor, that is, the moderator absorbs the heat generated by the fission process and carries it to a heat exchanger (not shown) where such heat is utilized or dissipated. Thus, the moderator-coolant 16 is continuously circulated through the tank 10 and the fuel element assemblies 12 by forcing the moderator-coolant through a center duct 35 in the bottom shield of the tank 10 and removing it through a side duct 36 in the bottom shield of the tank. Suitable ports 39 are placed in the reflector 20 and the shield 22 so that free neutrons may be passed out of tank 10 to surrounding compartments, etc., for radiation studies and tests.

Figure 8:
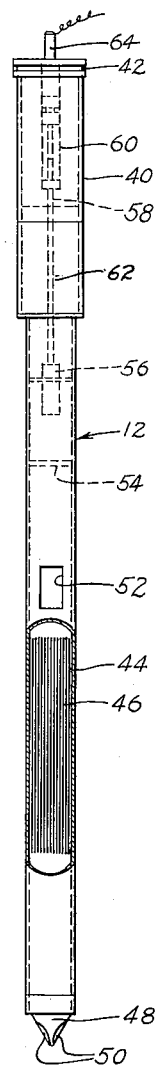
Fig. 8 is an elevational view of a standard fuel element.

The standard fuel element assembly 12 presently used in the reactor is illustrated in Fig. 8 where it can be seen that such assembly generally has a cylindrical outer shield portion 40 with top 42 thereof adapted to receive grappling or removal tools. Attached rigidly to such outer shield portion 40 is a rectangular casing 44 of aluminum or the like which is usually referred to as the fuel box. Within the fuel box 44 is a series of fuel plates 46 (shown in Fig. 8) wherein each plate is of a sandwich type construction having a uranium alloy jacketed on both sides with aluminum and each plate is spaced from the next adjacent plate. The bottom of the fuel box 44 has a nozzle 48 adapted to seat in a grid 49 (shown in Fig. 1) supported in the tank 10, and such nozzle has orifices 50

(shown in Fig. 8) therein to allow passage of the moderator-coolant 16 into the fuel box 44 between the fuel plates 46, whereafter it is discharged through the openings 52 in the fuel box wall. A flow meter may be inserted in the fuel element assembly 12 so that it is possible for the reactor operator to determine the amount of moderator-coolant flow in the fuel assembly at any time. The flow meter is illustrated in Fig. 8 and it includes a damping plate 54 affixed to a float 56 which will rest on the surface of the moderator-coolant contained within the fuel box 44, which surface is above that of the moderator-coolant in the tank due to the pressure of the forced flow of such moderator-coolant. It is this surface differential which indicates the amount of flow within the fuel box. The float 56 is attached to the removable armature 58 of the differential transformer 60 by means of the mast 62. Thus, as the float 56 rises or falls, the armature 58 is inserted in or removed from the differential transformer 60. The differential transformer is contained in the outer shield portion 40 of the fuel element assembly 12 and suitable electrical connections 64 transmit the flow information to the control panel of the reactor.

During normal reactor operation a "burn up" of the fuel occurs such that the amount of fuel available for fission is constantly decreasing. Further the fuel which has undergone fission leaves a residue of poisonous products, that is, the residue is a material which absorbs neutrons without producing fission or other useful results thereby decreasing the number of neutrons available for continued fission. This two fold "burn-up" requires a systematic and continuous replacement of the fuel element assemblies which means that the fuel element assembly must be removed from the core, transferred to a "hot lab" or a canal and ultimately have the fuel reprocessed before returning it to the core. It is usual to make such replacement when approximately 25 to 30% of the fuel has been consumed or has deteriorated.

The normal procedure for removal of the fuel element assemblies for the reactor illustrated in Fig. 1 is to remove the insert plug assembly 33 set into a hole 32 in the center shield 30 thereby exposing the inner shield 24 beneath the hole 32. A lead flask (similar to the type shown in Fig. 6) adapted to receive the fuel assembly 12 is positioned over the hole 32 and suitable grappling tools are inserted into the hole 32 and are lowered from an overhead crane to the top of the fuel element assembly 12 immediately below the hole where such tools engage the fuel element assembly and by lifting up the fuel element assembly is removed from the core through the inner shield plug 30 into the lead flask located directly overhead. The lead flask must be of greater length than the fuel assembly so as to receive the entire fuel assembly without exposing the surrounding area to the continuous gamma radiations from the still very active fuel element assembly. It is apparent that such an operation dependent upon the configuration of the fuel element assembly has many latent disadvantages, for example, a large overhead clearance above the reactor is necessary to accommodate the crane, flask and other mechanisms for effecting removal. The size and weight of the flask itself requires additional strength in the reactor to support the flask, and additional motive power to move the flask from the opening in the central shield to the "hot labs" or canal. Further, the extensive size of the flask requires a large initial investment thereby increasing the overall cost of the nuclear reactor facility. In addition, the present fuel element assembly is awkward to handle presenting problems in grappling therefor that are dangerous, inaccurate, unreliable and time consuming. It is to overcome these disadvantages and to provide a new and unique fuel element assembly that this invention is directed.

Figure 5:
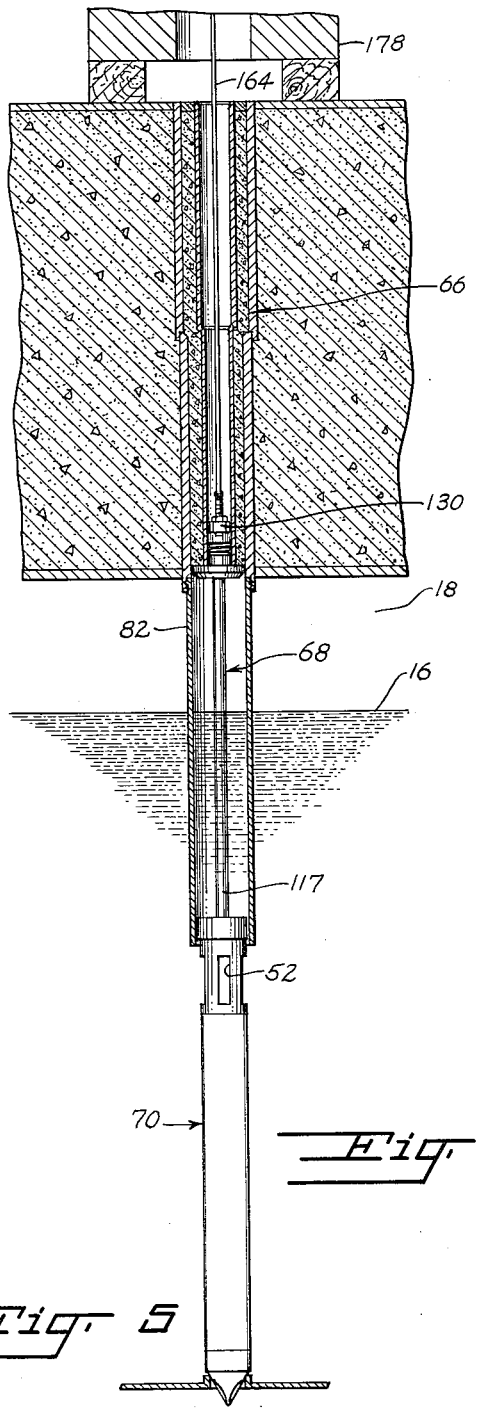
Fig. 5 is an enlarged sectional elevation of part of the reactor shown in Fig. 1, and showing one whole fuel element assembly prior to removal.

Considering Fig. 5 the fuel element assembly of this invention can be seen in position in the core of the reactor and it includes generally three sections, namely, an end section forming an outer shield plug 66, an intermediate section 68 and another end section constituting a fuel section 70. The necessary elements of conventional fuel element assemblies are included herein as for example the nozzle 48 (Fig. 8) adapted to seat in the grid 49 (Fig. 1), orifices 50 (Fig. 8) in the nozzle 48 to allow passage of the moderator-coolant through the fuel plates 46 within the fuel section 70 for discharge through the openings 52 in the fuel section 70. While a flow meter is not illustrated in Fig. 5 it should be understood that it may be included in the fuel element assembly of this invention in the same manner as in the standard fuel element assembly illustrated in Fig. 8. The outer shield section 66 is adapted to fit within the hole 26 of the inner shield 24 as shown in Fig. 1. The outer shield section 66 is attached by suitable means, to be hereinafter described, to the intermediate section 68 which in turn is rigidly affixed to the fuel section 70 above the discharge openings 52 thereby making one continuous fuel assembly.

Considering the foregoing in detail, the hole 26 in the inner shield 24 adapted to receive the fuel assembly can be seen from considering Fig. 3, wherein the inner shield 24 has an annular liner 72 set therein forming the hole 26 and such liner 72 is formed with an upper part 73 and a lower part 74 rigidly affixed to one another. The inner diameter of the upper part 73 is slightly larger than the inner diameter of the lower part 74 so as to form a shoulder 75 intermediate the overall length of the liner 72. A recess 76 is provided in the upper part 73 of the liner 72 and in the inner shield 24 to receive a bayonet lock 90 to be hereinafter described. An opening 78 is also provided in the upper part 73 to connect an emergency cooling system pipe 80 with the hole 26 for a purpose hereinafter to be described. A cylindrical sleeve 82 is rigidly affixed at one end as by threads or the like to the lower part 74 of the liner 72 and such sleeve extends downwardly past the level of the moderator-coolant 16 to approximately the juncture point of the intermediate section 68 and the fuel section 70 as can be seen in Fig. 5. This sleeve 82 insures that none of the helium gas will escape from the helium blanket 18 when a fuel element assembly is either inserted into or removed from the core of the reactor.

Referring to Figs. 3, 4 and 9, a hollow, cylindrical outer shield sleeve 84 of concrete is adapted to fit within the hole 26 (Fig. 1) such that the outer periphery of the outer shield sleeve 84 will lie adjacent the upper part 73 and the lower part 74 of the liner 72. The outside diameter of the outer shield sleeve 84 varies over its axial length so as to form a projection 85 which will rest on the shoulder 75 formed by the varying diameters of the liner 72 when the top of the fuel element assembly is flush with the top of the inner shield 24.

The outer shield sleeve 84 is bounded at each of its axial extremities by annular plates rigidly affixed thereto. The top plate is a cover 86 provided with suitable recesses 88 therein to form locking means to be hereinafter described. A bayonet lock 90 is set in the cover 86 and is adapted to fit the recess 76 in liner 72 and the inner shield 24 so as to lock the fuel element assembly in the inner shield 24 when such fuel element assembly is in place. Suitable sockets 176 are provided in the cover 86 adapted to receive a spanner wrench for opening or closing the bayonet lock 90 with reference to the inner shield 24. The lower end of the outer shield sleeve 84 is bounded by an annular supporting plate 92 to which is affixed by any suitable fasteners 94 a second annular plate 95 whose purpose is hereinafter described.

The outer shield sleeve 84 is bounded internally by a cylindrical wall 96 rigidly affixed thereto and formed in an upper portion 97 and a lower portion 98. The inner diameter of the upper portion 97 is slightly larger than the inner diameter of the lower portion 98 so that a shoulder 99 is formed intermediate the length of wall 96. The wall 96 extends the axial length of the outer shield sleeve 84 from the top thereof to the top of the second annular plate 95 at the bottom. The inner diameter of the second annular plate 95 is slightly less than the inner diameter of the wall of lower portion 98 so as to provide a stop 100, and the outer edge of the second annular plate 95 is beveled at a specific angle in order to provide an edge 101 whose purposes are hereinafter described.

The outer shield sleeve 84 has recesses 102 set into the outer periphery thereof beneath the cover 86 which recesses are adapted to receive the O-ring seals 104 which will abut the upper part 73 of the liner 72 and thereby provide a fluid tight seal. A passageway 106 is provided in the outer shield sleeve 84 extending from the outer periphery thereof to the bottom thereof where the passageway extends through the first and second annular plates 92 and 95 into the sleeve 82 which surrounds the intermediate section 68 of the fuel element assembly. The entrance 78 of passageway 106 is between the O-ring seals 104 and immediately adjacent the outlet of piping 80 when the outer shield sleeve 84 is in place thereby forming a continuous passage for the the emergency cooling water into the sleeve 82. Thus, when it is necessary to shut down the reactor because of some emergency condition, the moderator-coolant 16 is drained from the core causing the fission process to stop, and emergency cooling water ($H_2O$) is forced into the fuel element assembly through the piping 80 and passageway 106 from which it may then pass to the fuel plates 46 to remove heat.

The intermediate section 68 of the fuel element assembly shown in Fig. 3 includes a cylindrical head member 108 having an annular base plate 110, and a cylindrical vertical skirt 112 rigidly affixed to outer edge of the base plate 110. The upper edge 114 of the skirt 112 is beveled at an angle equal to the angle of the beveled edge of the second annular plate 95 of the outer shield sleeve 84 already described to insure proper seating when the head member 108 comes into contact with the outer shield sleeve 84. The fuel section 70 is rigidly affixed to head member 108 and suitable orifices 116 in the base plate 110 connects the space within the sleeve 82 with the fuel section for flow of the emergency cooling water into the fuel section 70. The base plate 110 is also rigidly affixed to the tubular member 117 projecting into the outer shield sleeve 84 where it is rigidly affixed to a hollow cylindrical collar 118 within the lower portion 98 of the wall 96. The maximum diameter of the collar 118 is slightly less than the minimum diameter of the wall 96 thereby permitting the collar to move therein and such movement is limited downwardly by the stop 100 provided by the second annular plate 95. An annular recess 120 is provided in the inner wall of the collar 118 to receive the locking means of the grappling tool hereinafter to be described. A biasing member or hold down spring 122 is mounted above the collar 118 and the spring in turn is held down by a hollow retainer ring 124 locked into the lower portion 98 of the wall 96 by a bayonet lock 126 set into the retainer ring and projecting into a recess 128 provided therefor in the lower portion 98 of the inner wall 96.

The grappling tool 130 is shown in Fig. 3 at a position above the normal seating position of such tool and it should be understood that this space is ordinarily filled by an inner shield plug 131 shown in position in Fig. 9 designed and constructed to fit within the void hollow portion of the outer shield sleeve 84. Considering Fig. 9 specifically, the inner shield plug 131 is shown in place atop the properly seated fuel assembly wherein the inner shield plug is formed of suitable shielding material such as concrete or the like and is adapted to fit within and lie adjacent the upper portion 97 and the lower portion 98 of the cylindrical wall 96. A bayonet lock 87 is provided in the top of the inner shield plug and is adapted to fit the recess 88 in the cover 86 of the outer shield sleeve 84 when the inner shield plug is properly seated. An edge 133 is provided intermediate the length of the inner shield plug 131 which will abut the shoulder 99 of the wall 96 when such inner shield plug is properly seated. Suitable sockets 174 are provided in the top of the inner shield plug 131 to receive a spanner wrench for opening or closing the bayonet lock 87 in the inner shield plug 131 with reference to the outer shield sleeve 84.

The grappling tool 130 illustrated in Fig. 3 in its non-locking position includes a solid cylindrical stopper 132, a tubular body 134 rigidly affixed at its lower axial extremity to the stopper and rigidly affixed at its upper axial extremity to hollow ring nut 136 hereinafter called the wrench nut. A cylindrical ball lock 138 within the tubular body 134 may be moved vertically therein by the vertical motion of a jackscrew 140 rigidly affixed to the ball lock and projecting out of the wrench nut 136. The jackscrew 140 is moved by means of an adjusting nut 142 set into the wrench nut 136 and held in such wrench nut by the annular retainer snap ring 144 so that as the adjusting nut 142 is turned relative to the wrench nut 136 the jackscrew will move up or down thereby moving the ball lock 138 into or out of locking position. Tapered openings 146 are provided in the tubular body 134 to receive the balls of the ball lock 138 when it is in its lifting position which balls will fit the recess provided in the collar 118 as can be seen in Fig. 4. The grappling tool 130 is rigidly affixed to a lifting cable 164 through eye 165 attached to the jackscrew 140.

The wrench nut 136 of the grappling tool 130 is provided with flanges 148 adapted to fit the retainer ring 124 when the wrench nut is seated on the retainer ring 124 as can be seen in Fig. 12, so that when the wrench nut 136 is rotated it will free the retainer ring 124 from the bayonet lock 126 in the lower portion 98 of the cylindrical wall 96.

Figure 7:
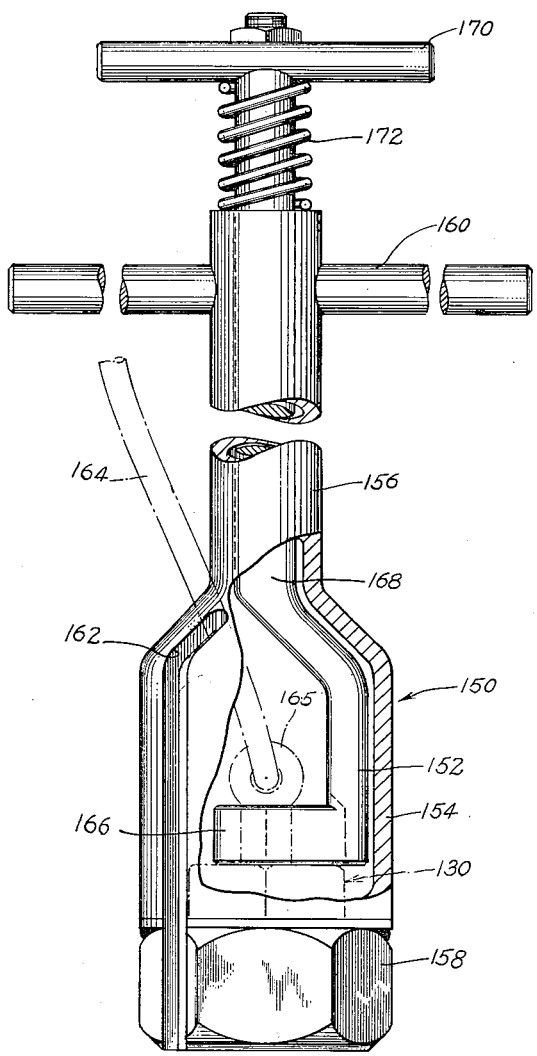
Fig. 7 is a sectional, partially cutaway elevation of a removal tool for use in connection with the fuel element assembly of the present invention.

The wrench unit utilized in the operation of the present invention is illustrated in Fig. 7 and includes generally two separate and individual wrenches one within the other, namely the outer hexagonal wrench 150 and the inner horseshoe wrench 152. The outer hexagonal wrench 150 is adapted to fit onto the wrench nut 136 and includes an elongated cylindrical hollow body 154, an elongated hollow shaft 156 formed with the body portion, a hexagonal base 158 formed with the body portion adapted to fit the wrench nut 136, and a handle 160 affixed to the shaft for turning the hexagonal wrench. A slot 162 is provided in the base 158 and the body 154 to receive the lifting cable 164 when the wrench unit is in position as can be seen in Fig. 4. The horseshoe wrench 152 is set into the hollow of the hexagonal wrench 150 and it includes a horseshoe shaped base member 166 adapted to fit the adjusting nut 142 when seated thereon, and an elongated shaft 168 formed with the base member 166 and shaped to fit and freely move within the hollow of the hexagonal wrench 150. This shaft projects out of the top of the hollow shaft 156 of the hexagonal wrench 150. A handle 170 is rigidly affixed to the projecting shaft 168 so that the horseshoe wrench 152 may be rotated. Since the operation of the wrench unit hereinafter to be described requires independent or separate action of the hexagonal wrench 150 and the horseshoe wrench 152, a biasing member 172 such as the spring shown in Fig. 7 is placed between the handle 170 of the horseshoe wrench and the top of the hollow shaft 156 of the hexagonal wrench, thereby keeping the horseshoe wrench above its seating position with the adjusting nut 142. When it is necessary to engage the adjusting nut 142 the handle 170 is pushed down and the spring 172 is compressed, thereby allowing the horseshoe wrench 152 to be properly seated. The handle 170 of the horseshoe wrench 152 is smaller in length than the handle 160 of the hexagonal wrench 150 so that either handle may be rotated without interference from the other.

Figure 6:
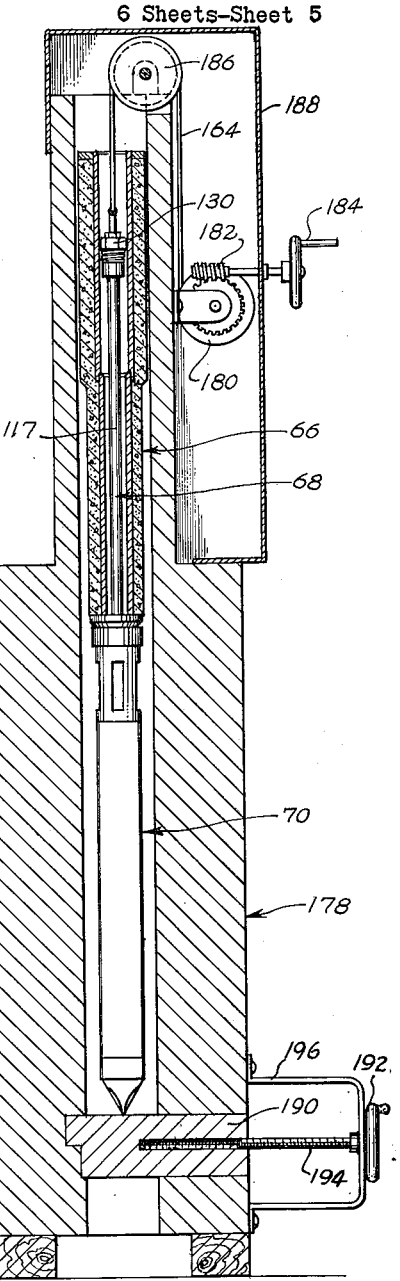
Fig. 6 is a sectional elevation of one of the fuel element assemblies shown in Fig. 1 but in contracted condition and enclosed in a flask after removal from the reactor.

The flask 178 and the grappling tool 130 are illustrated in Fig. 6 wherein the flask made of lead or other shielding material is of a hollow cylindrical construction having a greater thickness at its lower extremity than at the top, that is, a greater thickness in that part immediately adjacent the fuel box 44 of the fuel element assembly 12 carried within the flask since this is the portion subjected to the greatest irradiation. A drum 180 is actuated by turning a handle 184 which actuates a worm gear 182 causing the drum to rotate and the lifting cable 164 to be played out or retracted over the pulley 186. The grappling tool 130 attached to the lifting cable 164 projects into the hollow flask 178 and passes therethrough. A gas seal is provided atop the flask by means of a closed housing surrounding the aforementioned parts in their entirety with only the handle 184 projecting outside of such housing through any suitable gas seal. A movable lead block or gate 190 is set into the bottom of the flask 178 which will close off the hollow center of the flask after the fuel assembly 12 is in place within the flask as seen in Fig. 6. The block 190 is moved into and out of the flask 178 by means of a handle 192 and a threaded shaft 194 rigidly affixed to such block and handle and passing through the fixed bracket 196 adapted to receive such shaft.

The operation and various advantages of the present invention may be seen from a detailed consideration of the removal of a fuel element assembly from the core of the reactor shown in Fig. 1. Initially, the insert plug assembly 33 in the center shield 30 is removed thereby exposing the top of the fuel element assembly to be removed in the inner shield 24. A standard spanner wrench is inserted through the hole 32 in center shield 30 which will engage and loosen the inner shield plug 131 (shown in Fig. 9) by engaging the circumferentially displaced sockets 174 as seen in Fig. 10 and twisting inner shield plug 131 until the bayonet lock 87 is opened with reference to the outer shield sleeve 84. Another standard spanner wrench is inserted through the hole 32 which will engage and loosen the outer shield sleeve 84, by engaging the circumferentially displaced sockets 176 in the cover 86 of the outer shield sleeve 84 as seen in Figs. 3, 4 and 10, and twisting such outer shield sleeve 84 until the bayonet lock 90 is opened with reference to the inner shield 24. Standard grappling tools are then inserted into the hole 32 and the inner shield plug 131 is removed from the reactor. The flask 178 is positioned immediately adjacent but not over the hole 32 and the grappling tool 130 with the ball lock 138 retracted is lowered through the hollow flask and fed into the hole 32 and into the space left by the removed inner shield plug 131 (which is the position shown in Fig. 3) until it comes to rest on the retainer ring 124 as seen in Fig. 4. In this seated position the flanges 148 of the wrench nut 136 are within the openings provided therefor in the retainer ring 124 as can be seen in Fig. 12. Further, the tubular body 134 extends through the hollow retainer ring 124, the spring 122, and the collar 118 while the stopper 132 is within the tubular member 117.

The wrench unit is placed on the lifting cable 164 through the slot 162 and inserted through the hole 32 onto the now seated grappling tool 130. The lifting cable 164 is thus displaced as seen in Fig. 4 so as not to impede further operations of the wrench unit. When the wrench unit is properly seated, the hexagonal wrench is fitted onto the wrench nut 136 the flanges 148 of which are already seated in the retainer ring 124. By turning the handle 160 which is still above the center shield 30, the retainer ring 124 is rotated so as to open the bayonet lock 126 therein. When the retainer ring 124 is thus opened the spring 122 forces the retainer ring and grappling tool 130 upwardly bringing the tapered openings 146 in the tubular body 134 into alignment with recesses 120 of the collar 118. The handle 170, which too is still above the center shield 30, is now depressed and turned thereby turning the adjusting nut 142 causing the jackscrew 140 and the ball lock 138 to move vertically until the balls fall into the tapered openings 146. Continued vertical motion of the jackscrew 140 will lock the balls in the tapered openings 146 and in the collar 118 as seen in Fig. 4. The wrench unit is then removed.

After the wrench unit is removed the flask 178 is positioned over the hole 32 so that the fuel assembly may be lifted directly into the flask as can be seen in Fig. 5. The lifting cable 164 is now retracted causing the intermediate section 68 to move within the outer shield section 66, thereby telescoping the entire fuel element assembly. Specifically, the grappling tool 130, now locked to the collar 118 rigidly affixed to the tubular member 117 of the intermediate section 68, is retracted causing the retainer ring 124, spring 122, collar 118, and tubular member 117 to move into the space within the inner wall 96 of the outer shield sleeve 84. A groove 129 in the lower portion 98 of the inner wall 96 is provided to allow the bayonet lock 126 to move vertically as the remainder moves. The retraction continues until the skirt 112 of the head member 108 comes into contact with the second annular plate 95 of the outer shield sleeve 84 such that the beveled edge 114 of such skirt contacts the beveled edge 101 of such second annular plate. Continued retraction now lifts the outer shield section 66 along with the intermediate section 68 and fuel section 70 into the flask 178 as seen in Fig. 6. After the fuel assembly 12 is within the flask 178 the lead block 190 is closed thereby making the unit ready for transfer.

It is apparent that during the entire removal operation a maximum of shielding is provided over the fuel element assembly in that the grappling tool 130 immediately replaces the inner shield plug 131 after its removal and the outer shield sleeve 84 is constantly above the radiating fuel portion 70 so as to provide further shielding, thereby preventing the gamma and other radiations from going up the otherwise open recesses and so decreasing the radioactivity hazards for the persons operating atop the reactor. Further, the decrease in the size of the flask 178 is apparent from considering Fig. 6 where the telescoped fuel element assembly is contained entirely therein with a decrease in overall length of the flask and a decrease in the thickness of the upper portion of such flask since the outer shield portion 66 and the now telescoped intermediate portion 68 provide the necessary shielding above the fuel element assembly.

The insertion of the fuel element assembly into the core of the reactor is the complete reversal of the step by step removal operation already discussed where again the same increased safety factors, etc. will apply. This may be briefly summarized however as follows: (1) position the flask 178 and contained telescoped fuel element assembly over hole 32 and the open space within the core, (2) lower fuel element assembly into the core where the fuel element assembly will extend to its full length immediately upon lowering, that is, the intermediate section 68 will drop out of the outer shield section 66 until the collar 118 reaches the stop 100 provided by the second annular plate 95 of the outer shield sleeve 84, as seen in Figs. 3 and 4, (3) seat the nozzle 48 in the grid 49, (4) move the flask 178 from over the hole 32 but immediately adjacent thereto, (5) slide the wrench unit down the lifting cable 164 until it is properly seated, (6) turn the adjusting nut 142 by means of the horseshoe wrench 152 so as to unlock the ball lock, (7) turn the wrench nut 136 by means of the hexagonal wrench 150 thereby locking the retainer ring 124 with the outer shield sleeve 84 by means of the bayonet lock 126, (8) remove the wrench unit, (9) remove the grappling tool 130, (10) insert the inner shield plug 131, (11) insert the standard spanner wrench and lock the outer shield sleeve 84 with the inner shield 24 by means of the bayonet lock 90,

(12) insert the standard spanner wrench and lock the inner shield plug 131 with the outer shield sleeve 84 by means of the bayonet lock 87, (13) after removal of spanner wrenches insert the plug assembly 33 into the hole 32 of the center shield 30.

In general terms, the herein disclosed fuel element and shield plug assembly comprises an elongated fuel section, as represented by the lower end section 70; a rigid elongated supporting element, as represented by the intermediate section 68 which is connected with one end of the fuel section so as to extend lengthwise therefrom; a tubular outer shield plug as represented by the upper end section 66 which includes the outer shield sleeve 84 and the upper and lower portions 97, 98 of the cylindrical wall 96; and abutment elements which are connected, respectively, with the supporting element and shield plug in axially engageable relation to each other so as to determine telescopically expanded and contracted limit positions of said supporting element relative to said shield plug. In the illustrated embodiment of the invention the mentioned abutment elements are represented by the cylindrical head member 108 and the cylindrical collar 118 of the intermediate section 68 and by the plate 95 of the upper end section 66. The head member 108 and collar 118 represent axially spaced stops which are associated with the supporting element 68, and the plate 95 represents an abutment portion of the outer shield plug 66 between said stops so that telescopic movement of the supporting element 68 relative to the shield plug 66 will be limited by engagement of said stops with axially opposite sides, respectively, of the abutment portion.

The herein disclosed fuel element and shield plug assembly further comprises releasable locking means which are operatively interposed between the shield plug and supporting element for securing the supporting element against movement from its telescopically expanded toward its telescopically contracted position. In the illustrated embodiment of the invention such releasable locking means are represented by the bayonet lock between the retainer ring 124 and the shield plug wall portion 98. The bayonet lock comprises interengageable locking elements 126 and 128 which are movable into and out of registering relation with each other by movement of the supporting element 68 in telescopically expanding and contracting directions, respectively, relative to the shield plug.

While the preferred embodiments of this invention have been illustrated and described, it should be understood that the invention is not intended to be so limited but rather as it is defined by the following claims wherein, what we claim is:

1. A telescoping fuel element assembly for nuclear reactors comprising a plurality of sections, one end section forming an outer shield plug, another end section containing a fuel element, an intermediate section supported by and in telescoping relation with said outer shield plug, said fuel element containing section being supported by said intermediate section, means for locking said intermediate section in a predetermined telescopic relationship to said outer shield plug, means for disengaging said locking means and means for moving said intermediate section in telescoping relation with said outer shield plug and removing said assembly.

2. The telescoping fuel element assembly of claim 1, including means in said assembly for cooling said fuel element when said intermediate section is in retracted telescoping relation to said outer shield plug, and means for supporting said plurality of sections in a predetermined axial alignment.

3. The telescoping fuel element assembly of claim 1, including means connected to said fuel element containing section for engaging said outer shield plug when said intermediate section is telescopically retracted into said outer shield plug whereby continued movement after retraction of said fuel element containing section moves said outer shield plug.

4. The telescoping fuel element assembly of claim 1, including means connected to said outer shield plug for supporting said intermediate section and said fuel element containing section in a predetermined alignment with said outer shield plug.

5. The telescoping fuel element assembly of claim 1, including means connected to said outer shield plug for supporting said intermediate section and said fuel element containing section in vertical axis alignment with said outer shield plug, said means including at least one sleeve detachably connected to said outer shield plug and at least one element in slidable relation to said sleeve and connected to said intermediate section.

6. A telescoping fuel element assembly for nuclear reactors comprising a plurality of sections, one end section forming an outer shield plug, means for removably supporting said outer shield plug in said reactor, an intermediate section supported by and in telescopically movable alignment with said outer shield plug, means within said outer shield plug for resiliently holding said intermediate section in telescopic alignment with said outer shield plug, a fuel element section connected to and supported by said intermediate section, means for retracting said intermediate section in telescoping relation with said outer shield plug and for removing said assembly, and means for maintaining said telescopic alignment during said retraction.

7. The telescoping fuel element assembly of claim 6, including means connected to said retracting means for removing said resilient holding means and means on said fuel element section for engaging said outer shield plug when said intermediate section is retracted.

8. In a nuclear reactor fuel element assembly, the combination of an outer shield plug removably supported in the shield of said reactor, said outer shield plug having a chamber adapted to receive an inner shield plug, an intermediate section in telescopically movable alignment with and supported within said chamber, a fuel element integrally attached to one end of and axially aligned with said intermediate section, means on the other end of said intermediate section for resiliently locking said intermediate section in extended telescopic alignment relative to said outer shield plug, means for disengaging said locking means, means for moving said intermediate section into a retracted position within said outer shield plug, means on said fuel element section for engaging said outer shield plug during retraction, means for removing the retracted fuel element assembly from said reactor into a radiation shield, means for supporting said intermediate section and fuel element containing section against lateral movement during said retraction and means detachably connected to said outer shield plug and enclosing said intermediate section for sealing said chamber from the volume of said reactor above its moderator.

9. A fuel element and shield plug assembly for nuclear reactors comprising an elongated fuel section, a rigid elongated supporting element connected with one end of said fuel section to extend lengthwise therefrom, a tubular outer shield plug telescopically connected with said supporting element, and abutment elements connected, respectively, with said supporting element and shield plug in axially engageable relation to each other so as to determine telescopically expanded and contracted limit positions of said supporting element relative to said shield plug.

10. A fuel element and shield plug assembly for nuclear reactors comprising an elongated fuel section, a rigid elongated supporting element connected with one end of said fuel section to extend lengthwise therefrom, axially spaced stops associated with said supporting element, and a tubular outer shield plug telescopically connected with said supporting element and having an abutment portion between said stops so that telescopic movement of said supporting element relative to said shield plug will be limited by engagement of said stops with axially opposite sides, respectively, of said abutment portion.

11. A fuel element and shield plug assembly for nuclear reactors comprising an elongated fuel section, a rigid elongated supporting element connected with one end of said fuel section to extend lengthwise therefrom, a tubular outer shield plug telescopically connected with said supporting element, abutment elements connected, respectively, with said supporting element and shield plug in axially engageable relation to each other so as to determine telescopically expanded and contracted limit positions of said supporting element relative to said shield plug, and releasable locking means operatively interposed between said shield plug and supporting element for securing said supporting element against movement from said telescopically expanded toward said telescopically contracted position.

12. A fuel element and shield plug assembly for nuclear reactors comprising an elongated fuel section, a rigid elongated supporting element connected with one end of said fuel section so as to extend lengthwise therefrom, axially spaced stops associated with said supporting element, a tubular outer shield plug telescopically connected with said supporting element and having an abutment portion between said stops so that telescopic movement of said supporting element relative to said shield plug will be limited by engagement of said stops with axially opposite sides, respectively, of said abutment portion, and interchangeable locking elements connected respectively with said supporting element and shield plug and movable into and out of registering relation with each other by movement of said supporting element in telescopically expanding and contracting directions, respectively, relative to said shield plug.

References Cited in the file of this patent

UNITED STATES PATENTS

| | | |
|---|---|---|
| 2,851,410 | Vernon et al. | Sept. 9, 1958 |
| 2,852,458 | Dietrich et al. | Sept. 16, 1958 |

OTHER REFERENCES

LRL–150, Steele, June 1954, Office of Technical Services, Dept. of Commerce, Washington, D.C., 20¢.